Figure 1:
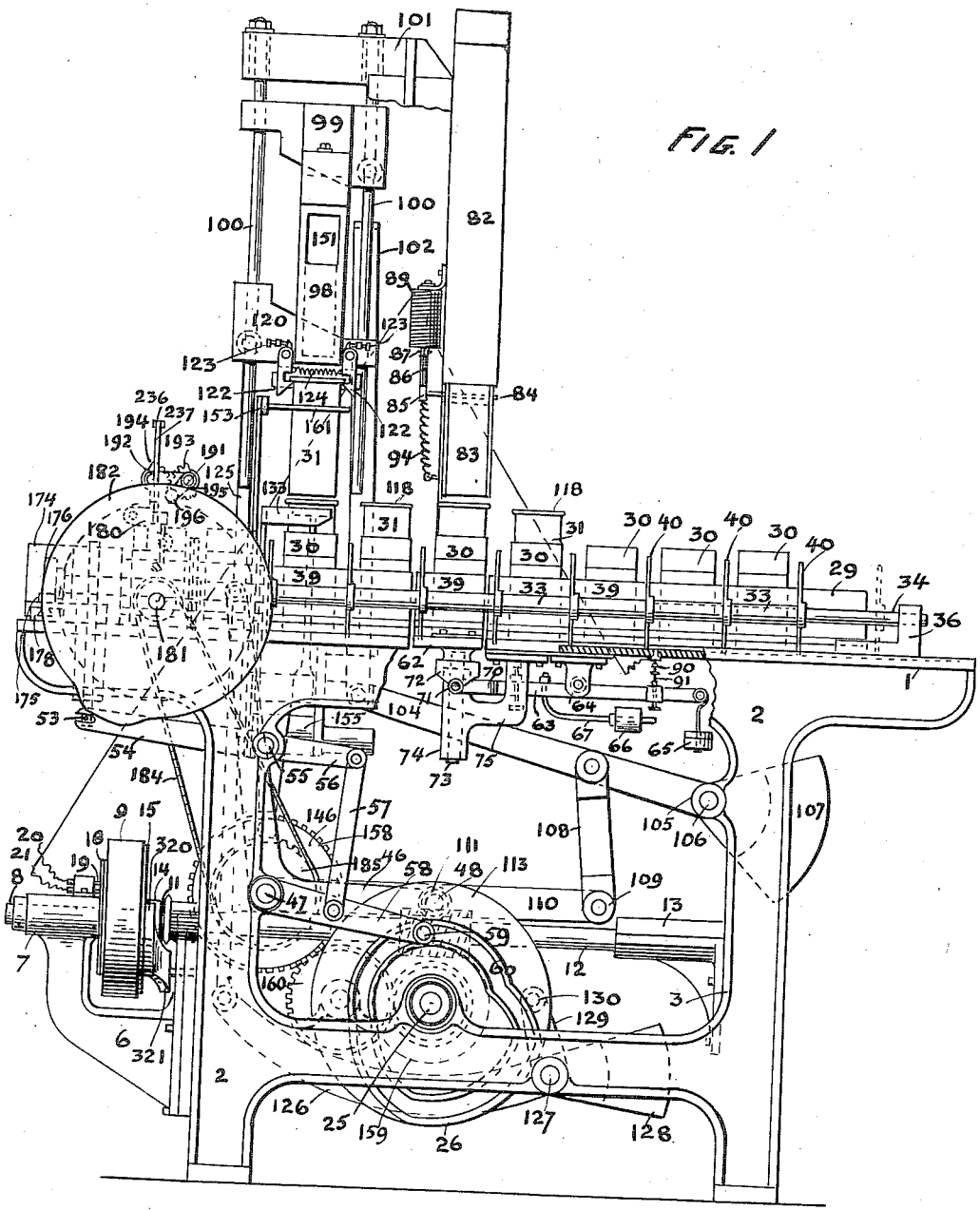

N. B. CONVERSE.
MACHINE FOR FILLING AND CLOSING CARTONS.
APPLICATION FILED NOV. 10, 1904. RENEWED MAR. 2, 1911.

1,044,500.

Patented Nov. 19, 1912.

14 SHEETS—SHEET 3.

WITNESSES:

INVENTOR:
N. B. Converse
By
F. M. Wright,
Atty.

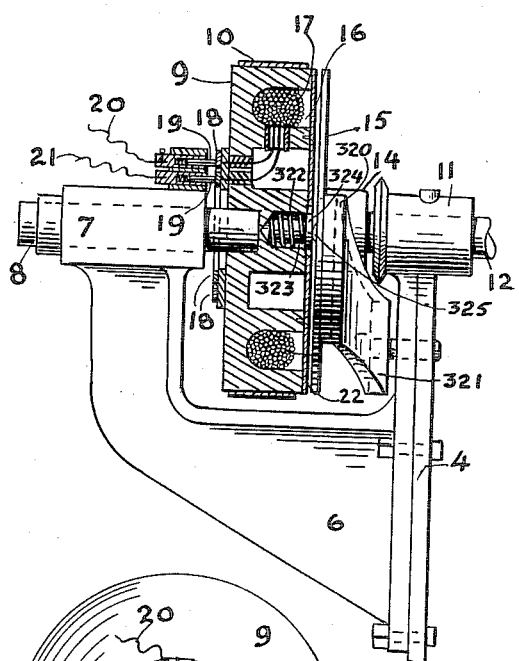

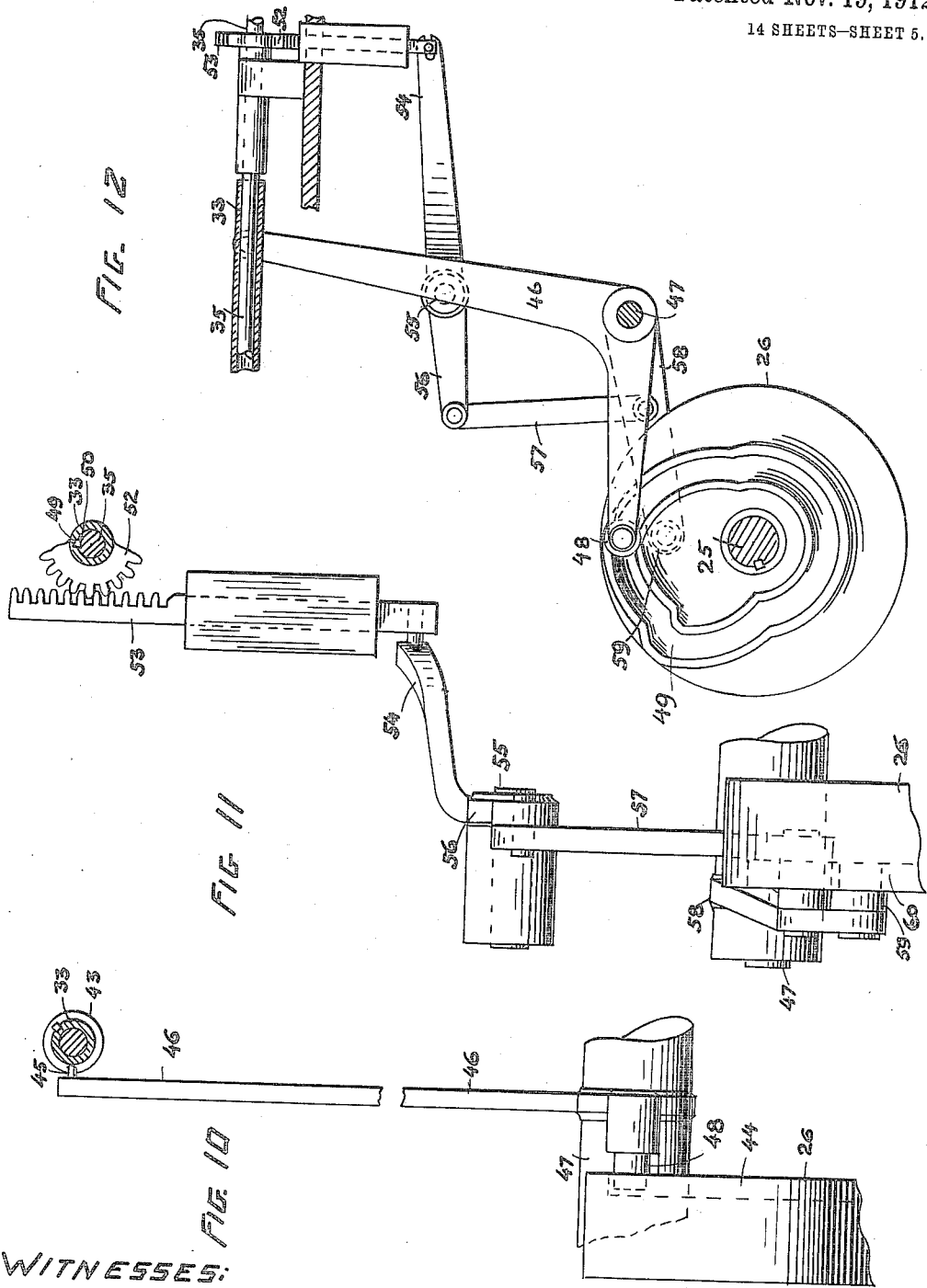

N. B. CONVERSE.
MACHINE FOR FILLING AND CLOSING CARTONS.
APPLICATION FILED NOV. 10, 1904. RENEWED MAR. 2, 1911.
1,044,500.
Patented Nov. 19, 1912.
14 SHEETS—SHEET 6.
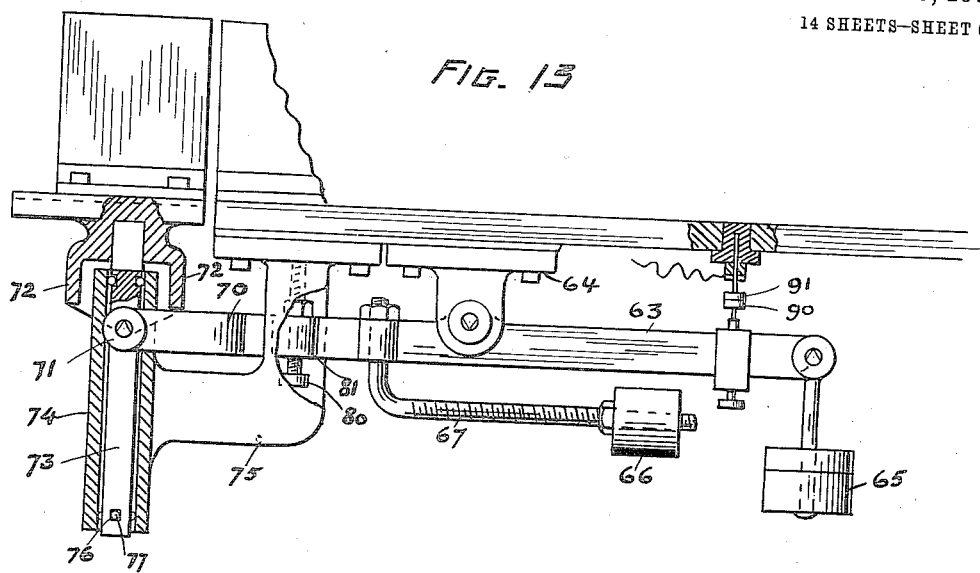
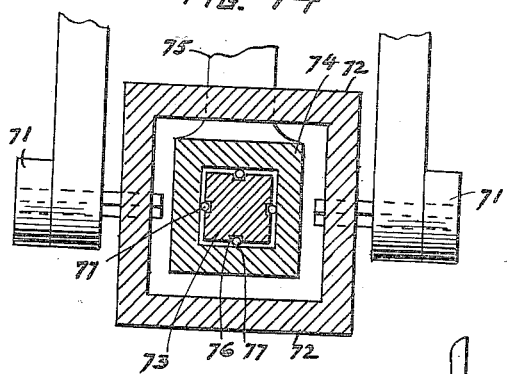
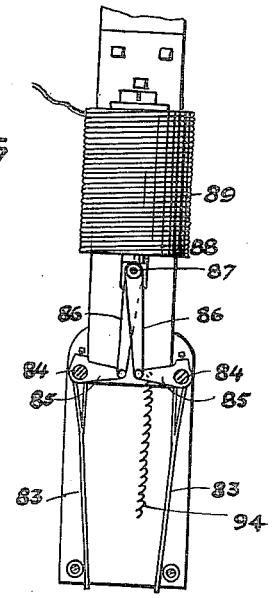
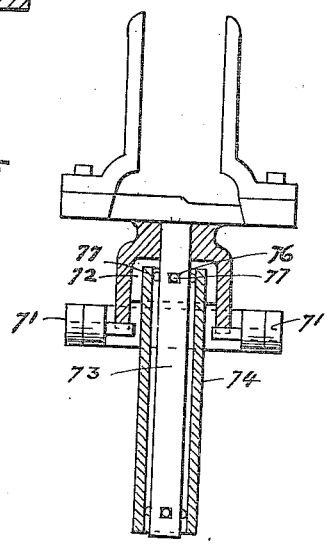
WITNESSES:
INVENTOR:
N. B. Converse,
By F. M. Wright,
Atty.

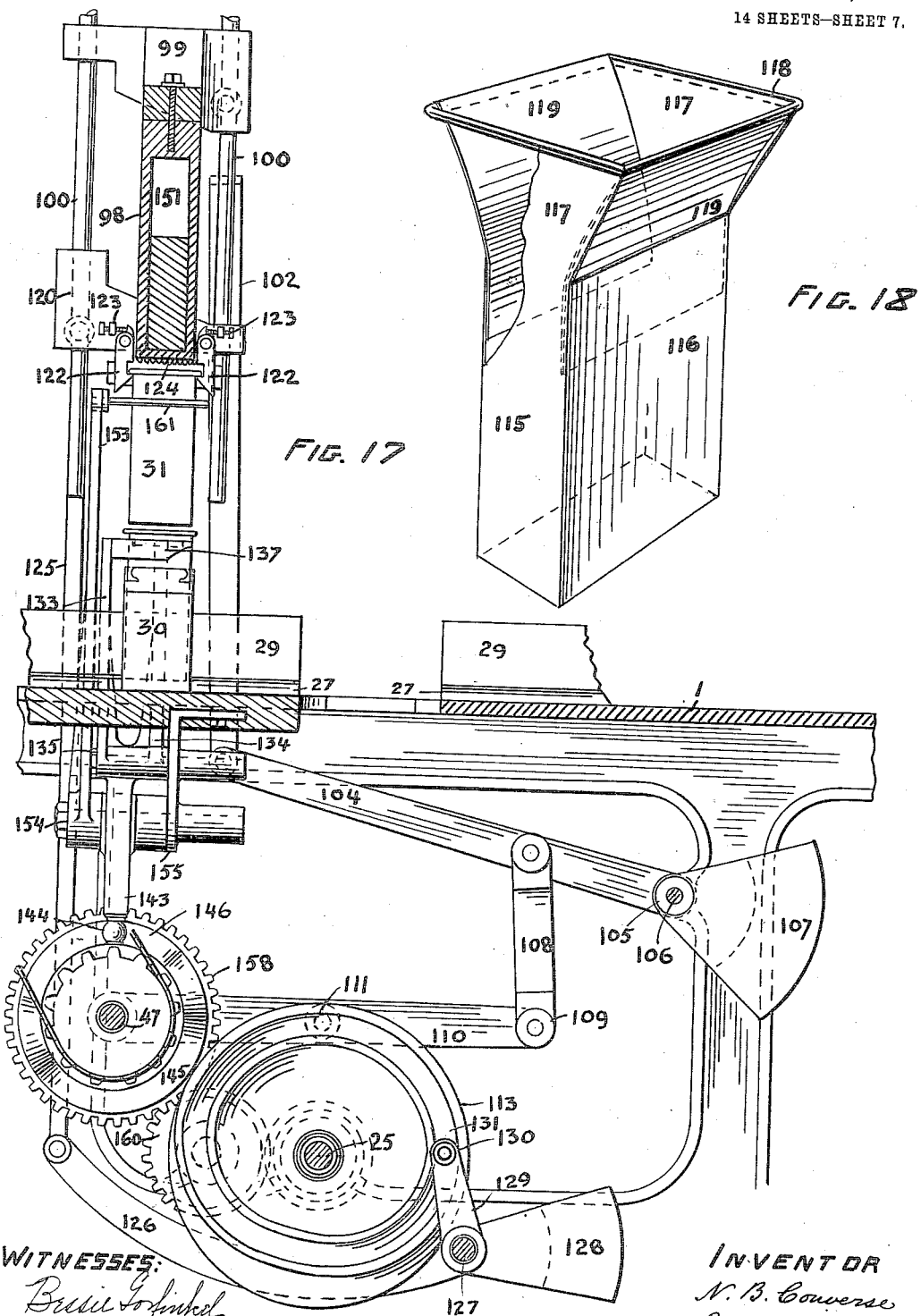

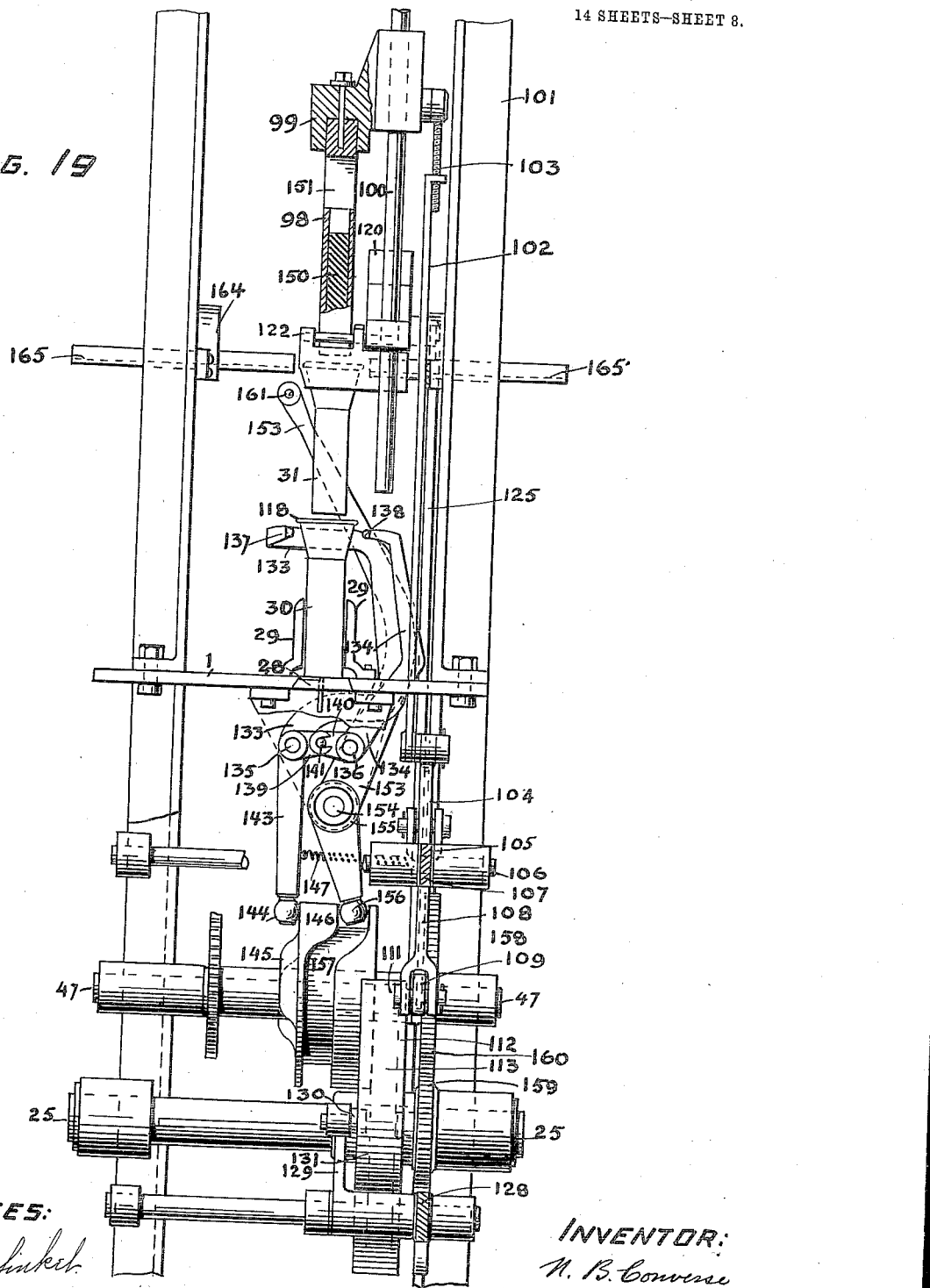

N. B. CONVERSE.
MACHINE FOR FILLING AND CLOSING CARTONS.
APPLICATION FILED NOV. 10, 1904. RENEWED MAR. 2, 1911.
1,044,500.
Patented Nov. 19, 1912.
14 SHEETS—SHEET 9.
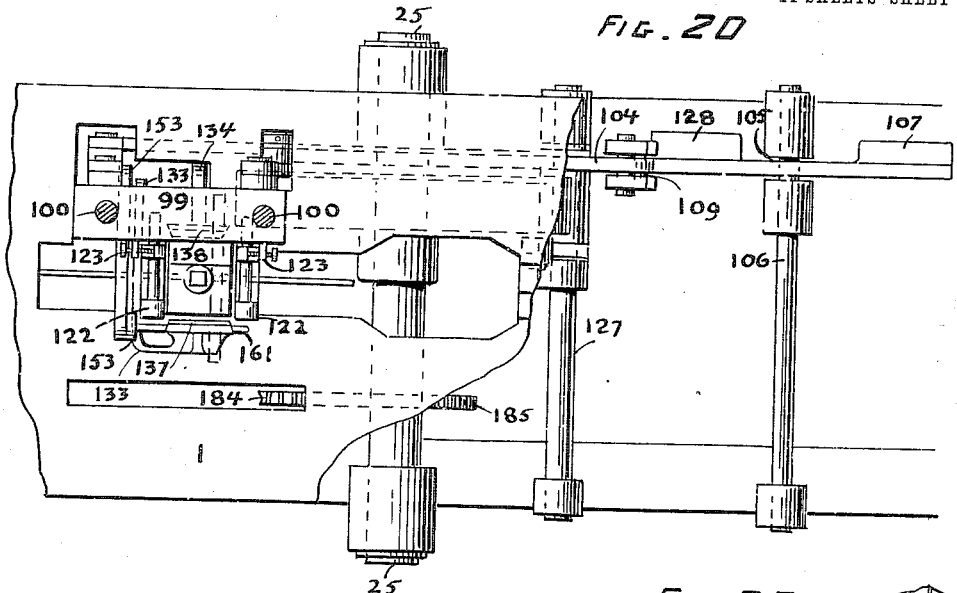
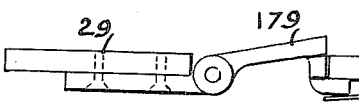
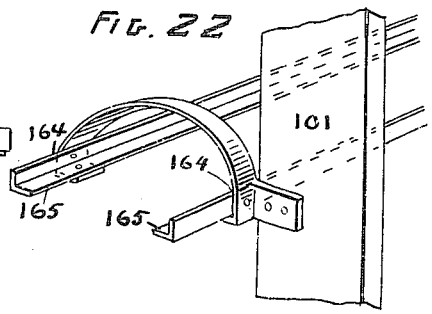
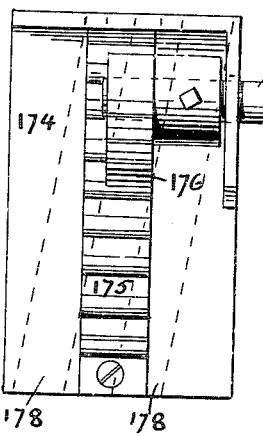
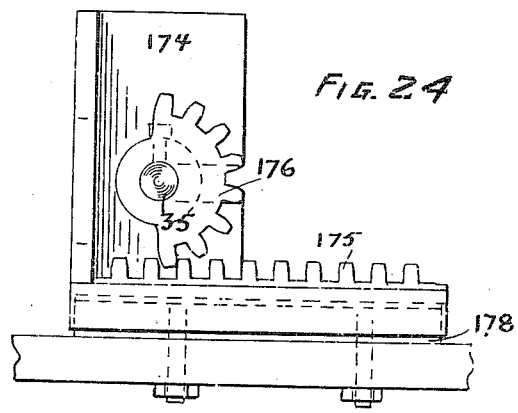
WITNESSES:
INVENTOR:
N. B. Converse
By F. M. Wright
Atty.

N. B. CONVERSE.
MACHINE FOR FILLING AND CLOSING CARTONS.
APPLICATION FILED NOV. 10, 1904. RENEWED MAR. 2, 1911.
1,044,500.
Patented Nov. 19, 1912.
14 SHEETS—SHEET 10.
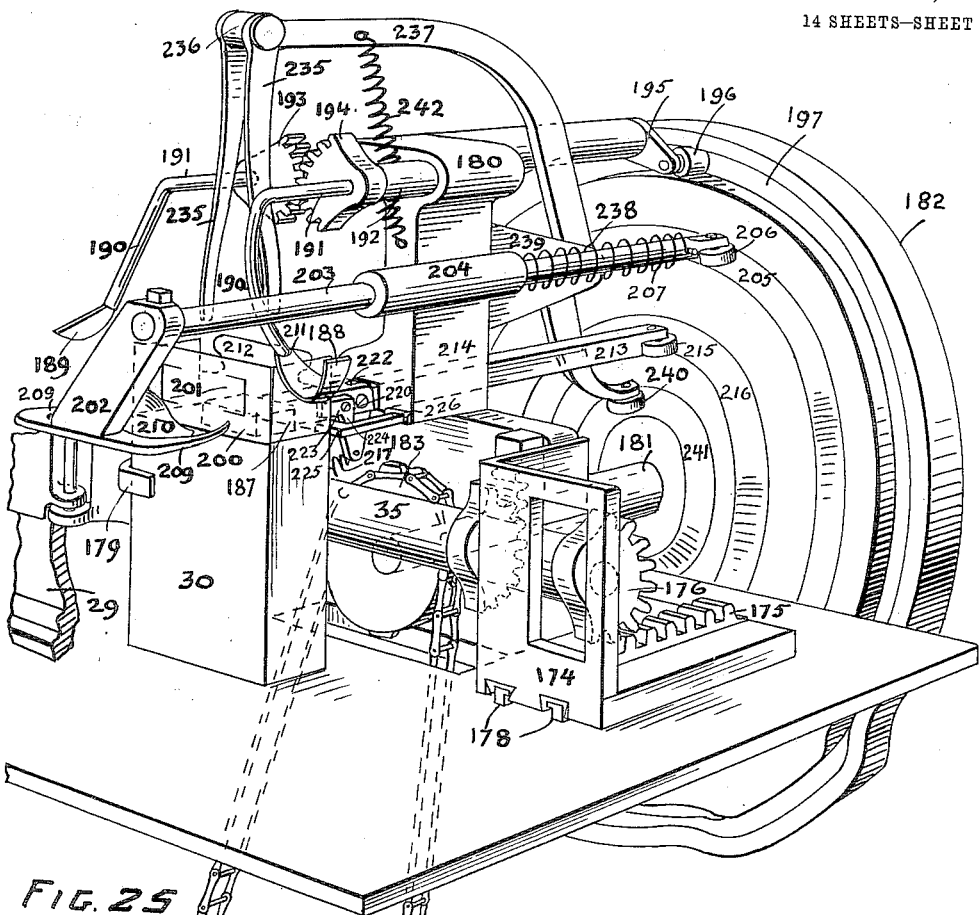
FIG. 25
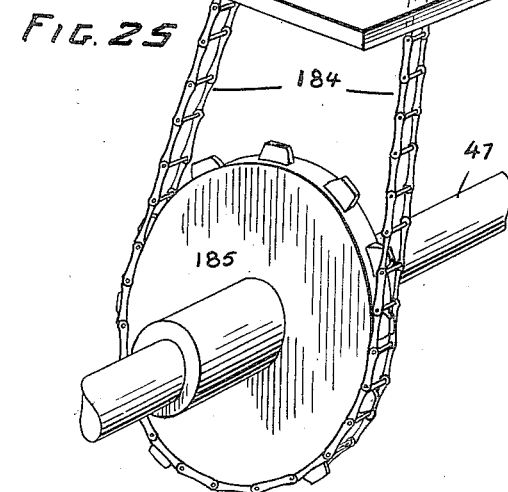
FIG. 26
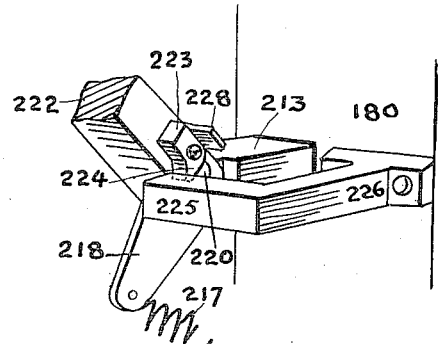
WITNESSES:
Buur Gorfinkel
Leon Poirillot
INVENTOR:
N. B. Converse
By
F. W. Wright
Atty.

N. B. CONVERSE.
MACHINE FOR FILLING AND CLOSING CARTONS.
APPLICATION FILED NOV. 10, 1904. RENEWED MAR. 2, 1911.
1,044,500.
Patented Nov. 19, 1912.
14 SHEETS—SHEET 11.
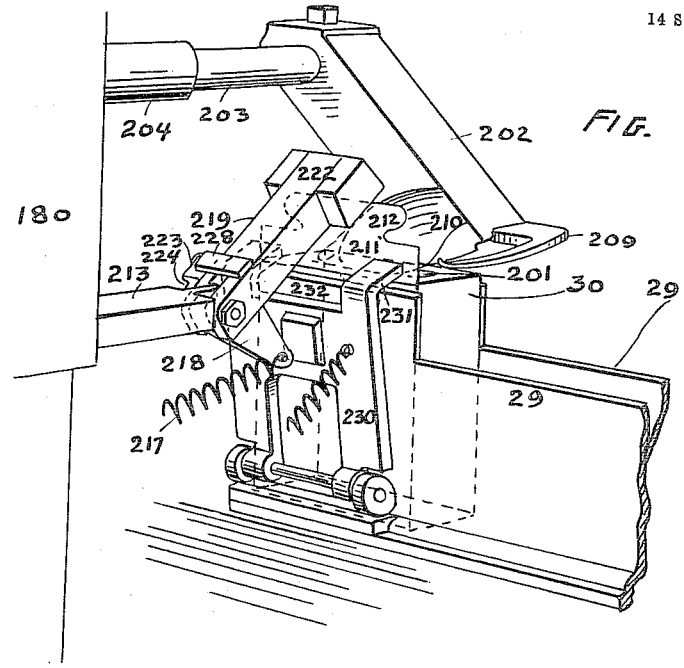
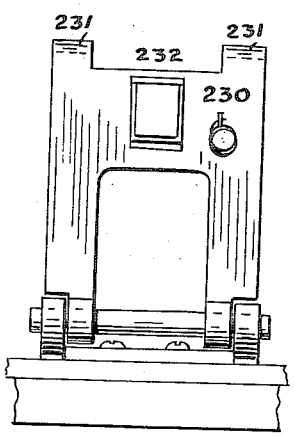
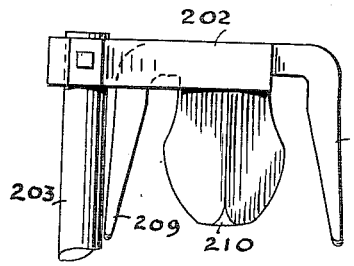
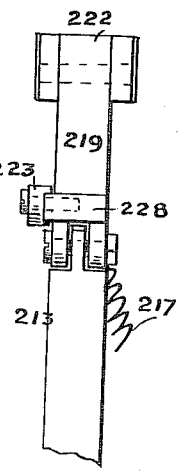
WITNESSES:
INVENTOR:

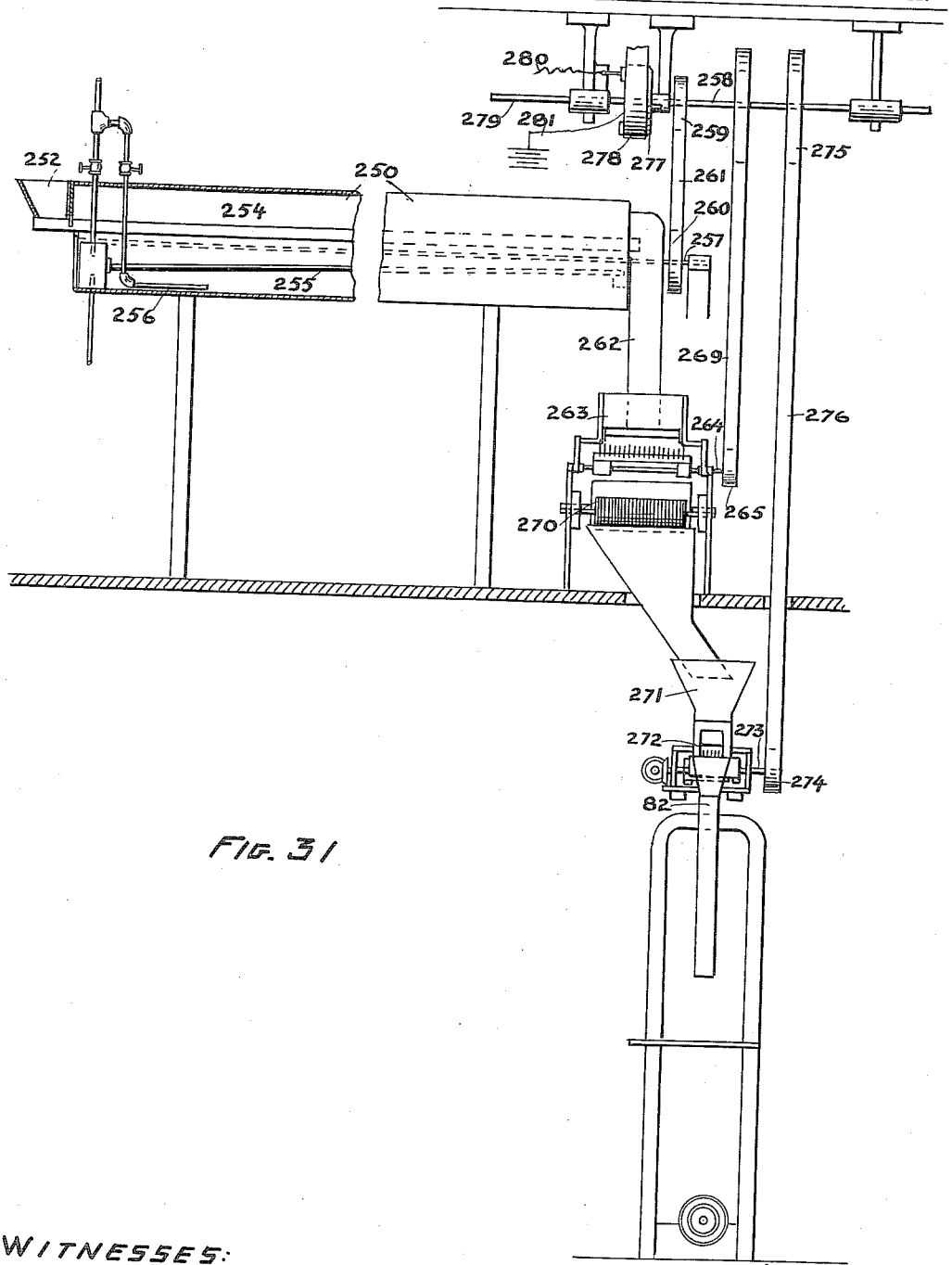

N. B. CONVERSE.
MACHINE FOR FILLING AND CLOSING CARTONS.
APPLICATION FILED NOV. 10, 1904. RENEWED MAR. 2, 1911.
1,044,500.
Patented Nov. 19, 1912.
14 SHEETS—SHEET 13.
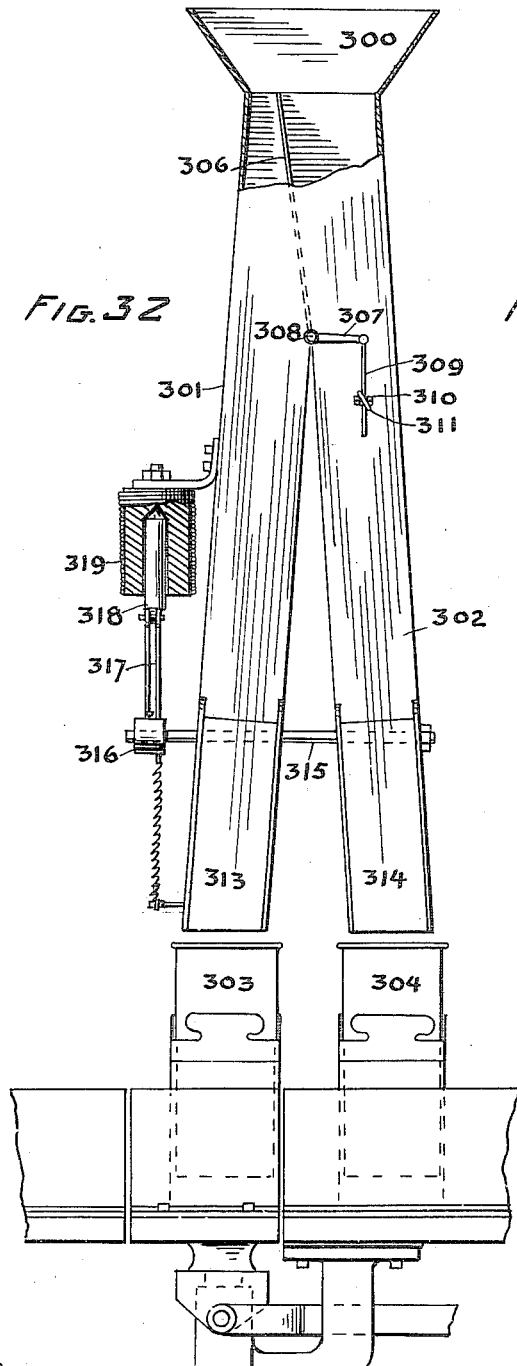
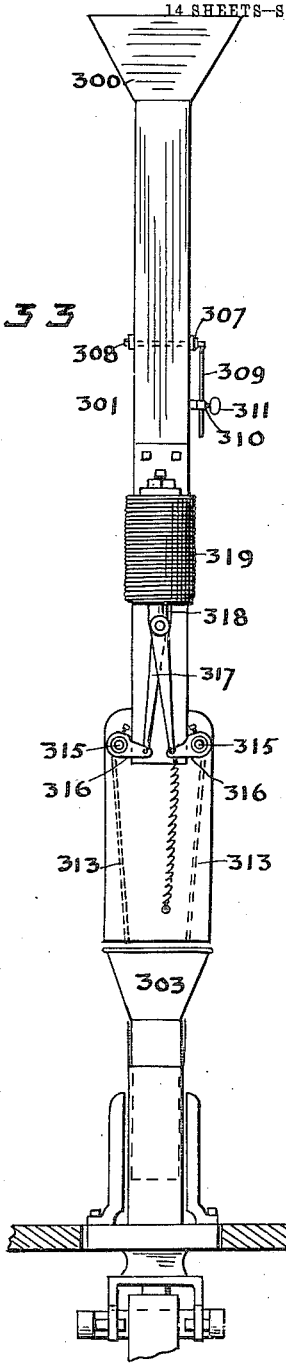
WITNESSES:
Bessie Gorfinkel
Leon Boillot
INVENTOR:
N. B. Converse
By
F. W. Wright,
Atty.

N. B. CONVERSE.
MACHINE FOR FILLING AND CLOSING CARTONS.
APPLICATION FILED NOV. 10, 1904. RENEWED MAR. 2, 1911.
1,044,500.
Patented Nov. 19, 1912.
14 SHEETS—SHEET 14.
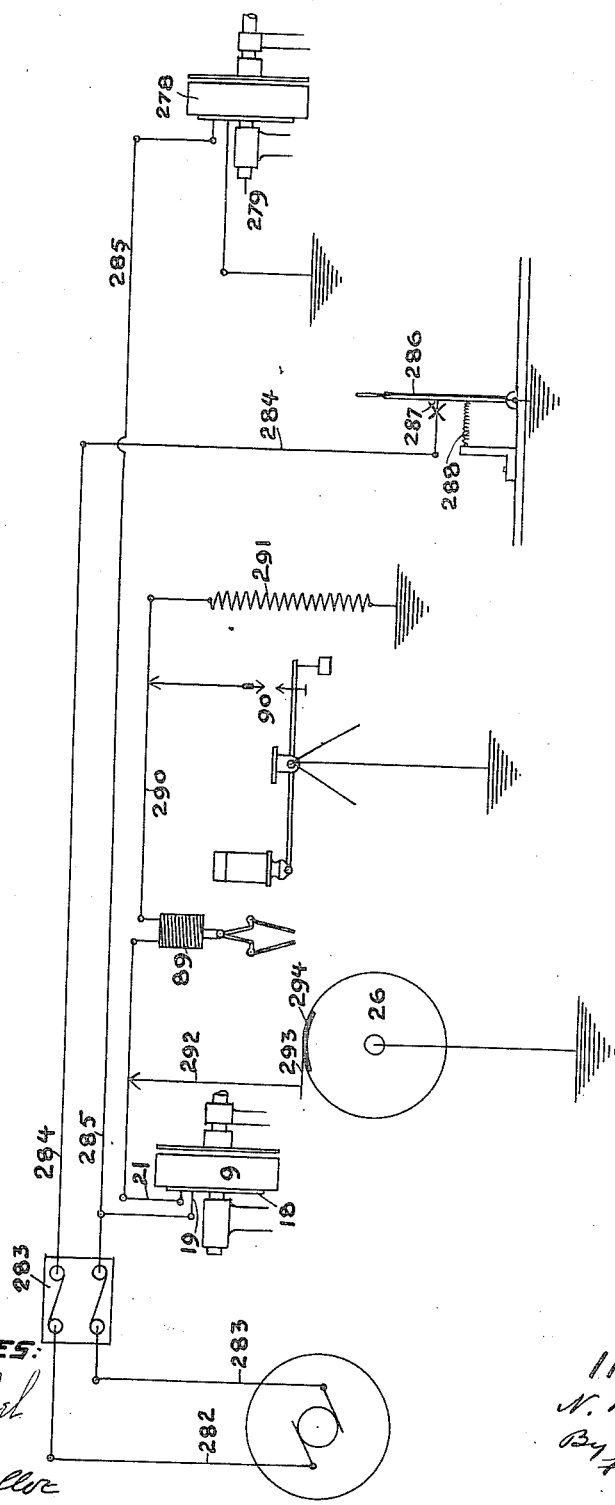

UNITED STATES PATENT OFFICE.

NEWTON BOOTH CONVERSE, OF FRESNO, CALIFORNIA, ASSIGNOR, BY DIRECT AND MESNE ASSIGNMENTS, TO HIMSELF, J. E. DICKINSON, FRANCIS M. WRIGHT, B. W. NORTON, L. Z. ICKES, AND K. ARAKELIAN, TRUSTEES.

MACHINE FOR FILLING AND CLOSING CARTONS.

1,044,500. Specification of Letters Patent. Patented Nov. 19, 1912.

Application filed November 10, 1904, Serial No. 232,089. Renewed March 2, 1911. Serial No. 611,937.

*To all whom it may concern:*

Be it known that I, NEWTON BOOTH CONVERSE, a citizen of the United States, residing at Fresno, in the county of Fresno and State of California, have invented certain new and useful Improvements in Machines for Filling and Closing Cartons, of which the following is a specification.

This invention relates to a machine for filling cartons with a weighed quantity of material usually packed in cartons, such as raisins or other fruit, and closing the cartons thus filled.

The object of the invention is to provide a machine of this character by which the above work will be done automatically after the cartons have been placed in position and the delivering funnels have been inserted thereinto, one which will pack and close a large number of cartons in a given time, and in which the machine shall maintain itself clean and free from the sticky residue from raisins or other fruits.

Figure 2:
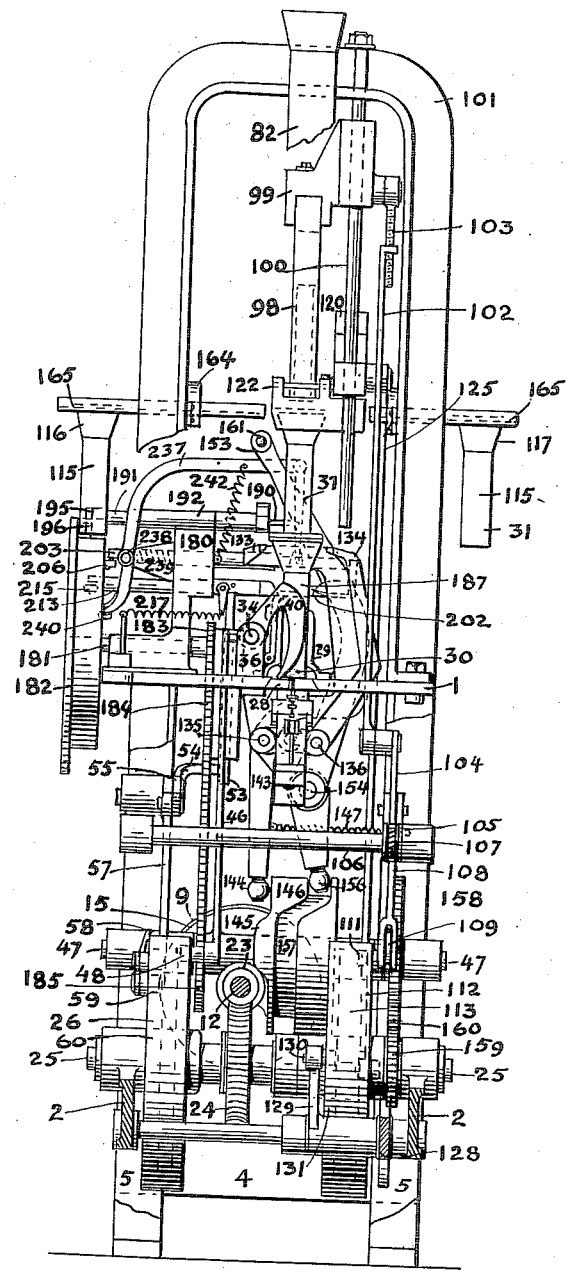
Figure 3:
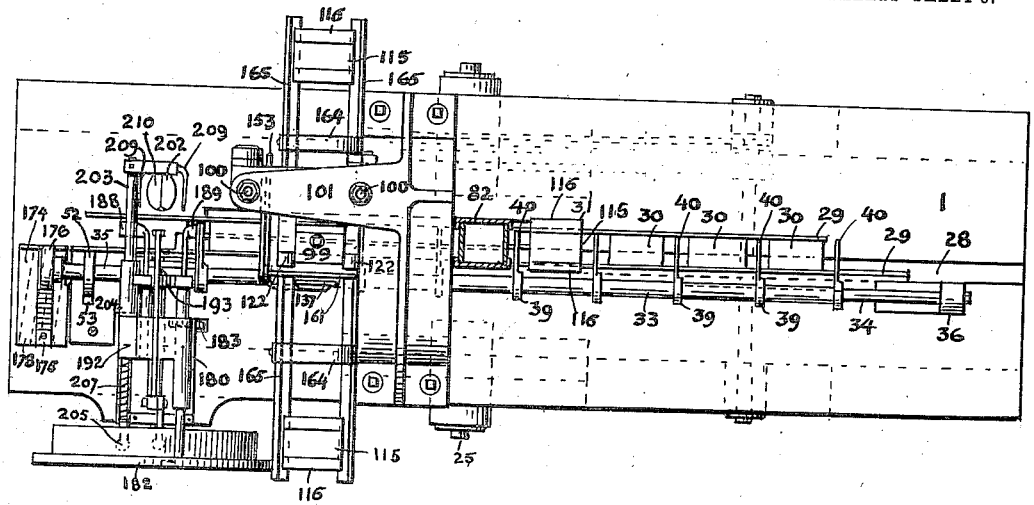
Figure 4:
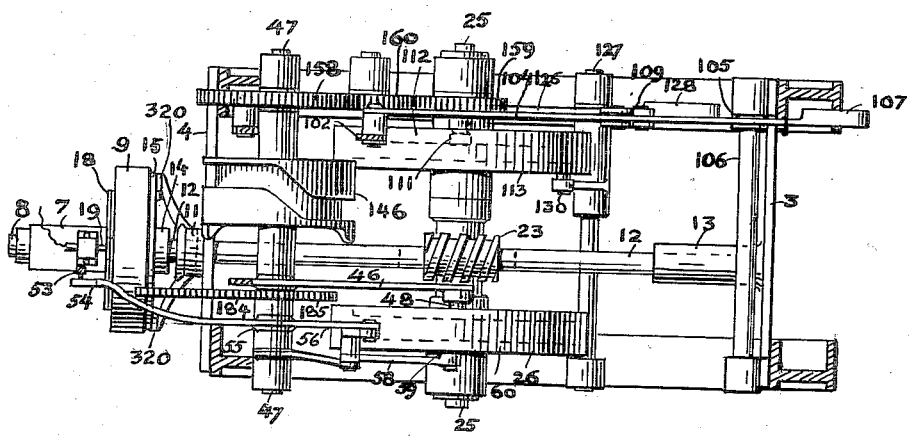

In the accompanying drawings, Figure 1 is a side elevation of the apparatus; Fig. 2 is an end view thereof, certain parts being broken away; Fig. 3 is a plan view thereof; Fig. 4 is a plan view of the lower portion thereof the frame being broken away; Fig. 5 is a vertical section of the electro-magnetic clutch, the bearings being shown in side elevation; Fig. 6 is a broken rear view of the clutch; Fig. 7 is a front view of the same; Fig. 8 is a cross section of the channel for the cartons, showing the pushers elevated; Fig. 9 is a similar view showing the pushers in their operative position; Fig. 10 is a detail rear view of the lever for advancing the pushers; Fig. 11 is a detail rear view of the mechanism for rocking the pushers; Fig. 12 is a side view of the same; Fig. 13 is a detail side elevation partly in section of the scale beam; Fig. 14 is an enlarged horizontal section of the guide for the scale pan; Fig. 15 is a vertical section of the same; Fig. 16 is a detail side elevation of the mechanism for controlling the supply of material; Fig. 17 is a detail vertical section of the plunger and extractor mechanism; Fig. 18 is a perspective view of a funnel; Fig. 19 is a rear detail view of the same; Fig. 20 is a horizontal section showing the same; Fig. 21 is a detail of the stop for justifying the carton below the closing mechanism; Fig. 22 is a detail of one of the chutes for the funnels; Fig. 23 is a detail plan view of the discharging mechanism; Fig. 24 is a rear view of the same; Fig. 25 is a perspective view of the closing mechanism; Fig. 26 is an enlarged detail view of a portion thereof; Fig. 27 is a perspective view of a portion of said closing mechanism from the other side of the machine to that illustrated in Fig. 25; Figs. 28, 29 and 30 are details of parts of the closing mechanism; Fig. 31 is a view partly diagrammatic of a raisin packing plant; Fig. 32 is a side elevation of a modified form of spout; Fig. 33 is an end view of the same; Fig. 34 is a diagrammatic view of the electrical connections.

Referring to the drawing, 1 represents a frame or table supporting the machine, comprising the side castings 2 connected at the feed end by a cross piece 3, and at the delivery end by a cross piece 4 bolted to flanges 5 of said side castings. To said cross piece 4 is bolted a forked casting 6 carrying a bearing 7 for a stud shaft 8 which carries a pulley 9 driven by a belt 10 from any suitable source of power. The casting also having a second bearing 11 for the end of the main driving shaft 12, the other end of said driving shaft revolving in a bearing 13 secured upon the cross piece 3 at the feed end of the frame. Said main shaft is revolved from the stud shaft by the following mechanism. It carries on its end next said stud shaft a hub 14 having a cast iron disk 15, said hub being slidably connected to said main shaft but imparting rotation thereto when the disk 15 itself is rotated. The driving pulley is made an electro-magnet by having formed therein a circular recess 16 in which is a coil of wire 17, the ends of which are passed through the pulley and are connected to collector rings 18 on the rear side of the pulley which revolve against brushes 19, connected with the wires 20, 21 in the electric circuit. The arrangement of the circuit will be described later, but when the current is turned on said pulley becomes an electro-magnet and attracts the disk 15. However, between said disk and pulley there is interposed a thin sheet 22 of copper riveted on to the cast iron pulley. This sheet acts as a diamagnetic shield, or breaks the magnetic circuit between the pulley and cast iron disk when the current is turned off, thus preventing the residual magnetism left in the pulley from having any appreciable effect upon the cast-iron disk, although it is not sufficiently effective to prevent the attraction of the disk by the magnet when the current is turned on; thus immediately the current is cut off, the electro-magnetic pulley ceases to act on the disk.

In order to rapidly bring the shaft 12 to rest when the current is turned off, the disk 15, then being no longer attracted by the pulley is pressed against stationary shoes 320 secured on a brake piece 321, this pressure being applied by a spring 322 in a central recess 323 of the pulley, said spring being coiled around the stem of a plunger 324 the head of which presses against a button 325 formed on the center of the disk 15. When the current is on the attraction overcomes the pressure of this spring, but when the circuit is cut off, the spring presses the disk 15 against the brake shoes.

The stages in the operation of the machine in which the main shaft is started and stopped revolving by the energizing and de-energizing of this electro-magnet will be subsequently described, as will be also the general arrangement of the electric circuit.

The main driving shaft 12 carries a worm 23 which meshes with a worm wheel 24 on a transverse shaft 25 having its bearings in the side castings 2 of the frame, and thus imparts revolution to cam wheels 26 on said shaft which control the movements of the machine. Before describing the several operations of these cams it may be stated that the movement of the machine is intermittent in character, the length of time during which the machine is at rest depending upon the accuracy with which the velocity of feed of the raisins or other material is timed to correspond with the speed at which the machine disposes of the cartons after they are filled. If the feed be so timed as on the one hand to keep pace with the disposition of the cartons and, on the other hand, not to over feed, then there will be practically no period of rest of the machine.

Upon the frame is secured a channel or guideway 28 for cartons 30 having side walls 29 which recede at the bottom, as shown at 27, to provide a clearance for the bottom of the carton. This is an important feature, as it reduces the friction caused by advancing the cartons in the channel. But for this clearance the bottom of the carton, being the stiffest part thereof, would be very tight while the top would be comparatively loose. This construction also assists in maintaining the cartons upright. Into the feed end of said channel (on the right in Fig. 1) the cartons 30 are inserted successively, either by a machine for forming the carton from the flat blank and inserting it into the guideway, (which, however, forms no part of the present invention), or by an operator. At each side of the guideway are operators, one or more, who insert into each carton a funnel 31, having previously wrapped around the same the waxed paper with which it is necessary to line the carton before packing the same with the fruit or other material. The cartons, with the funnels therein, are advanced in line toward the weighing mechanism by the following means:— Extending on one side of the channel or guideway is a tube 33, the ends of which receive, and are supported by, shafts 34, 35, extending horizontally and longitudinally from standards 36 mounted upon the table of the machine. This tube can therefore slide longitudinally upon these shafts and can also rock thereon. Both of these motions are necessary for advancing the cartons. The tube has a longitudinal feather 37 which passes through feather ways 38 in hubs 39 of hooked shaped pushers 40, the pushers being thus maintained always in alinement with each other and being spaced at the proper uniform distance from each other and secured at such distance by set screws 41. Thus the pushers move longitudinally and rock with the tube, and their movement is as follows:—From the rear position in which a pusher rests behind a carton it is moved forward a sufficient distance to move said carton with it into the place of the carton preceding it. It is then moved slightly backward so as to permit one of them to clear a certain latching stop, as will be hereinafter explained. It is then rocked upward so as to be clear of the carton. It is then returned to a position between the succeeding two cartons, and it is then rocked downward so as to drop behind the next carton succeeding that which has been just pushed forward by said pusher. Thus in each complete circle of its movements it advances the carton through the space between successive cartons in line with the same.

To obtain the longitudinal movement of the pushers, there are provided upon the tube 33 collars 43, between which is a pin 45 secured to the end of a lever 46 loosely pivoted upon transverse shaft 47, the other arm of said lever carrying a roller 48 which runs in a cam groove 49 in the wheel 26 upon the transverse shaft 25. By suitably shaping said cam groove the required longitudinal movement is given to said pushers to advance the cartons the proper distance. The rocking motion of said pushers is produced as follows:—The end of the tube 33 next the delivery end of the machine has an internal feather 49 which slides in a groove 50 in the shaft 35, so that when said latter shaft is rocked so also is the tube 33 and the pushers secured thereon. Said shaft 35 is rocked by means of a gear wheel 52 thereon which is engaged by a vertically sliding rack 53, the lower end of which has a slotted engagement with the end of a lever 54 pivoted at 55, the other arm 56 of said lever being connected by a link 57 with a lever 58 loosely pivoted upon the shaft 47, the end of said lever carrying a roller 59 which rides in a cam groove 60 on the other side of the wheel 26 to that in which the cam groove 49 was formed. By giving the proper shape to said groove 60 the shaft 35, and so also the pushers, are rocked at suitable times to, first, withdraw them from the path of the cartons and then, after they have been moved back, to drop them down again behind the cartons ready for another advance. The table is recessed as shown at 42, to permit the pushers to extend below the bottoms of the cartons, so that they can apply the propulsive force at their stiffest parts, the bottoms. At a suitable point the channel is open at the bottom which permits stray raisins or other material to drop through which would otherwise clog up the channel. The channel has then a longitudinal bridge formed by a narrow blade 51, secured by the casting 155. This blade then supports the cartons between the walls of the channel. The cartons thus advanced along the guideway are brought in succession on to the scale platform 62 which rides upon the end of the scale beam 63, the latter being pivoted beneath the table, as shown at 64, and suitably weighted at the rear end, as shown at 65, according to the weight of the material it is desired to pack in each carton, and also being provided with an adjusting weight 66 screwed upon an extension 67 of the scale beam for accurately adjusting the weight. The end of the scale beam is forked, as shown at 70, and provided with bearings 71 for the side plates 72 of the scale platform. From the center of said platform extends downwardly a stem 73 which slides vertically in a bearing 74 in a bracket 75 secured upon the under side of the table, said stem having recesses 76 in which are balls 77 to reduce friction in the vertical movement of the scale platform, while closely confining the same to its vertical path. The upward movement of the platform is limited by a screw 80 screwed into a boss 81 in the beam, which screw abuts against the surface of the bracket 75 when the scale platform has reached its uppermost position.

When the carton on the platform is filled and is in its lowest position, the top of the scale platform is on a level with the guideway or table, but when the carton is pushed off and an empty carton takes its place, the scale platform immediately rises under the action of the weight at the other end of the scale beam. The empty carton upon the scale platform is underneath the delivery spout 82, which spout is controlled by gates 83 hinged at their upper ends, their lower ends closing together when the gates are shut and preventing the delivery of any of the fruit. Said gates are rigidly attached to rock shafts 84 which extend through the sides of the spout and carry, outside the spout, cranks 85 attached by links 86 to a pin 87 secured on the end of a solenoid core 88, surrounded by a coil of wire 89, which, at a proper time in the operation of the machine, is included in the same circuit as that which energized the electro-magnet of the driving pulley.

The circuit through the solenoid wire passes through a contact 90 secured upon the weighted arm of the scale beam and a contact 91 supported upon the under side of the table, so that when the scale platform is depressed, said contacts are closed and the solenoid is energized, thus closing the gates and preventing any more raisins dropping into the carton. But as soon as the scale platform rises, owing to the substitution of an empty carton for a full one, said contacts 90, 91, are separated, the solenoid is deënergized and the gates open, said opening being accelerated by the action of a spring 94. This immediately allows the raisins or other material to drop from between the gates through the funnel into the carton, and they will continue to so drop until the carton has received such a weight thereof that the scale platform again descends, again closing the contacts, again energizing the solenoid and closing the gates, when the carton will be filled and will be ready for advancing to permit another to take its place. In order to prevent raisins or other fruit sticking to the gates and thus accumulating in the spout, the gates have facings of absorbent material which absorbs the moisture from the fruit and thus remains moist, and prevent the fruit sticking thereto. In addition, moisture may be provided from any extraneous source if desired. The carton, now having been filled to the proper weight, is passed, with its funnel, off from the weighing platform and on to the table in the line of the guideway, and the next operation is that of packing the fruit in the carton and removing the funnel therefrom. The carton does not, however, immediately pass from the scale platform to the point where this packing takes place, but to an intermediate station, and on a second advance passes from said intermediate station to the point where it is packed.

A plunger 98 is secured in a carrier 99, which slides on vertical guides 100 depending from the top of an auxiliary U-shaped frame 101 supported on and secured to the table. The plunger is drawn down to press the raisins in the carton by means of a connecting rod 102 adjustably attached by means of a screw 103 to the carrier. The lower end of the connecting rod is attached to a lever 104 pivoted at 105 on a cross shaft 106 on the frame, and having a counter balance weight 107, and to said lever is attached a link 108 connected at its lower end, as shown at 109, to a lever 110 upon the shaf 47. Said lever carries, at about the middle thereof, a roller 111, which rolls in a cam groove 112 in a wheel 113 on the transverse shaft 25. Thus at the proper time in the revolution of said shaft 25, said plunger is depressed to press the fruit in the carton, and is subsequently raised therefrom. After the raisins have been pressed in the carton, the next operation is that of removing the funnel, the plunger remaining in the carton while the funnel is being removed. This funnel comprises two sides 115, which extend up to the top of the funnel, and which flare outwardly at their upper ends, and the two other sides 116 which extend only to the bottom of the flaring portions 117 of the sides 115. A rod 118, bent into a rectangular form, is secured to the upper edges of the sides 115 and also connects these sides with each other. Sheets 119 of spring metal are secured at their lower edges to the tops of the sides 116 and these spring metal sheets tend normally to spring outward so as to close the openings between the upper edges of the sides 116 and the two sides of the rod 118 which are not attached to the sides 115, and it is in this form when they are inserted by the operators into the cartons.

120 represents the body of the funnel extractor sliding on the vertical guides 100 and carrying downwardly depending hooks 122. These hooks have screws 123 limiting their inward movement, which is caused by a spring 124 connecting the two hooks. This extractor 120 is, at a proper time in the operation of the machine, drawn down by a connecting rod 125 connected to a curved lever 126 pivoted on a cross shaft 127 in the frame of the machine and having a counter balance weight 128, said lever having an arm 129 with a roller 130 rolling in a cam groove 131 in the same wheel 113 as that used for the plunger roller 111. This cam causes the extractor to descend, so that the hooks thereof pass over the edges of the funnel, and then immediately spring in underneath said edges. At the same time the spring plates 119 of the funnel are pressed inward so as to straighten the same and cause the fruit to pack closely.

For the purpose of pressing the spring plates together there are provided clamping levers 133, 134, which are pivoted at 135, 136, and have fingers 137, 138, extending inwardly from opposite sides against the spring plates of the funnel, and said levers are caused to co-act by means of two short arms 140, 139, extending therefrom, one arm 140 having a pin 141, and the other a recess engaged by said pin. One of these arms 139 is extended downwardly, as shown at 143, and carries on its lower end a roller 144 which is engaged by a crown cam 145 on a wheel 146 on the shaft 47. The roller is held against the cam by means of a tension spring 147 connected to the extension 143 and to the frame of the machine.

The cams 112, 131, are so constructed that the rollers 111, 130, are left therein in close proximity to their respective declines and inclines in said grooves, so that, when the scale platform descends, and the circuit is closed by the ascent of the other end of the scale beam, the rollers immediately thereupon move in their grooves so as to simultaneously start the plunger and extractor in their descent and the clamps to close in upon the spring plates of the funnel. The extractor continues to descend, the hooks thereof pass underneath the rim of the funnel, and then the plunger presses down upon the fruit or other material and compresses the same within the funnel which in its turn is supported within the carton. In order to prevent the raisins or other fruit sticking to the bottom of the plunger, the plunger is provided on its pressure surface with absorbent material, which is maintained moist by the moisture of the fruit, and in its moist condition prevents the sticking of the fruit thereto, but in addition there may be provided, as herein shown, absorbent material 150 within the plunger, which is hollow, said absorbent material being connected with the pad by pieces of string or other capillary substance passing through apertures in the bottom of the plunger. One side of the plunger, near the top, is open, as shown at 151, to enable water to be added at suitable intervals. After the plunger and extractor descend, the plunger remains in the carton to hold the carton and fruit down while the funnel is being elevated. After the funnel is clear of the carton, then the plunger rises, commencing its ascent before the extractor has stopped rising, the plunger continuing its ascent until it is clear of the funnel, which is then pushed to one side. The funnel is discharged to one side or the other of the machine by means of a shifter lever 153, pivoted at 154 on a stud on a casting 155 bolted on the under side of the frame, said lever having an arm extending downward from its pivot and carrying at its lower end a roller 156 rolling in a cam groove 157 on the periphery of the wheel 146 on the shaft 47. This shaft 47 is driven from the transverse shaft 25 by means of gears 158, 159, and an intermediate gear 160, so that the shaft 47 makes one revolution for every two revolutions of the shaft 25. The object of this is to cause the lever 153 to swing to one side during one revolution of the shaft 25 and back again during the next revolution thereof, so that the funnels are moved alternately to one side and the other. Said funnels are so moved by means of an arm 161, extending from the upper end of said lever 153 which engages the funnel, and slides it on the supporting hooks 122 until the funnel is moved off said hooks and on to a chute or track 164 having underhanging inwardly extending flanges 165 which engage the rim of the funnel and thus support it. Each funnel, when so moved on to one or the other of said tracks 164, pushes forward all of the funnels already on the tracks and these funnels remain on said tracks until they are taken from the same by the operators to use them over again.

It will be observed that the funnels are kept free from sticky residue of the fruit by the fact that their outer sides are constantly wiped against the oiled paper when they are withdrawn from the cartons, and their inner sides are wiped by the plunger and the pad thereon. The sides of the funnel are thus also maintained slightly damp by said pad.

After the carton has left the location in which the raisins or other material are pressed down into place, then, having been pushed forward one stage by the pushers, in the manner already described, it remains at rest during the next cycle of operation of the machine, and is then pushed another stage forward to the position where the top of the carton is closed by passing the tongues into the slits thereof. It is not, however, at first pushed into the exact position for this operation but slightly past the same, and is then justified in the exact position by special mechanism for this purpose. This mechanism comprises a latching stop 179 which is pivoted at one side of the path of the carton on a vertical pivot 171 and is moved inward into the path of the carton by a spring 172. The carton in its forward movement presses the latching stop outward, which immediately thereafter springs inward, when the carton has passed the same. The pusher opposite this latching stop is made of extra thickness, as seen in Fig. 3, and it is to clear this latching stop by this pusher that the pushers are given a slight backward motion after their forward movement. To move the carton back against said stop so that it will be in the exact position for closing the top, the same mechanism is utilized which discharges the cartons already closed. This mechanism comprises a laterally sliding discharger 174 having a rack 175 operated by a segment gear 176 upon the longitudinal shaft 35. This segment gear 176 is so arranged on said shaft that when the pushers 40 are descending behind the cartons the rack 175 is moved backward or away from the path of the cartons. There is then a period of rest for this rack 175 while the pushers 40 are moving forward and transferring the cartons from one station to the next. This operation brings a carton into the path of the discharger 174 and then, on the return movement of the discharger due to the motion of the segment upon the shaft 35, said carton is discharged to one side, out of the path of the remaining cartons. This latter movement is also utilized to justify the carton which is being brought to the position for closing the top, by making the slideways 178 for the discharger oblique and sloping rearwardly inward or toward the guideway for the cartons. The discharger, being thus given a rearward movement, as well as a lateral movement, transmits this movement to the carton succeeding that which is being discharged, and this again transmits the movement to the carton which is underneath the mechanism for closing the top, bringing the latter carton up against the spring actuated stop 179, and placing it in the exact position for the operation of the closing mechanism. This closing mechanism is as follows:—Upon one side of the guideway is secured a frame 180 in which is a horizontal transverse shaft 181 carrying a cam disk 182 having thereon various cams for operating the different members of the closing mechanism. This cam disk is rotated by means of a sprocket wheel 183 on the shaft of the cam wheel driven by a sprocket chain 184 from a sprocket wheel 185 on the shaft 47. The first part of the operation of closing the top is to turn inward the two small plain flaps 187 of the top of the carton. These small flaps are moved inward by means of two turner plates 188, 189, on the ends of bars 190 depending from horizontal shafts 191, having bearings in an upper extension 192 of the frame 180, said shafts being connected by segment gears 193, 194, so as to swing together in unison, one of said shafts having a crank 195 thereon carrying a roller 196 which moves in a grooved cam 197 on the face of the cam disk 182. The cam is arranged to move said plates toward each other at the proper moment to close the flaps. It will be observed that one of said plates 188 is much larger than the other 189 and is curved backward or outward; the object of this is to enable the plate to pass into proper position to engage the flap 187 on that side, notwithstanding the shaft 203 hereinafter described which overhangs said flap. After these short unslitted flaps 187 have been thus closed, the next operation is that of depressing the flap 200 which has the slits 201 therein. This is accomplished by means of a depressor 202, which is carried on a slide bar 203 sliding in a bearing 204 in the frame 180, said depressor being moved outward by means of a crown cam 205 upon the cam disk 182, operating against a roller 206 upon the end of said slide bar, and being moved inward by means of a compressed coil spring 207. When the crown cam recedes so as to allow the spring 207 to operate said spring moves said depressor inward, thereby causing it to turn over the slit flap 200. This depressor is provided with two side fingers 209, the ends of which are slightly raised so as to impinge upon the flap a sufficient distance above the bending line to cause the flap to bend over on said line. Then a broad central shaper 210 impinges upon the flap and presses the flap into a horizontal position. The width of this shaper 210 is slightly less than the distance between the two slits 201 in this slitted flap.

It is now necessary to push down the opposite flap 211, which has the ears or tongues 212 to enter said slits 201. This is accomplished by means of a slide bar 213 sliding in a bearing 214 in the frame 180, and having a roller 215 operated by a crown cam 216 on the cam disk 182, which cam moves said slide bar outward, said slide bar being moved inward by means of a coiled spring 217 attached to an arm 218 of a lever 219, pivoted, as shown at 220, to said slide bar 213. The spring 217, being attached to the depending arm, draws the front arm 222 of the lever downward. Upon the side of said arm 222 is pivotally attached a catch 223 having a shoulder 224. When the lever has been withdrawn to its rearward position, this shoulder 224 is in engagement with a shoulder 225 on a stationary casting 226 secured to the frame, and the first result of moving the lever forward or outward is therefore to tilt upward the front end of the arm 222, because the shoulder 224 cannot descend, and therefore the pivotal point of attachment of the catch 223 to the arm 222 must ascend as the lever is forced forward, and this likewise raises the front end of the arm 222. A stop 228 above said catch 223 limits its upward movement. Now as the slide bar 213 moves outward, carrying with it the lever 219, and the forward end of the arm 222 moves upward as described, said front end, which is made broad so as to cover a considerable extent of surface of the flap, moves over said flap and presses it down on to the shaper 210. At the same time the lower depending arm 218 strikes the rear side of a bender 230 pivoted to the table, and moves said bender forward. This bender is forked at its upper end 231, as shown in Fig. 27, leaving an intermediate recess 232, so that the forks pass on each side of the main body of the lever 222. These forks 231 are now pressed down upon the sides of the flap 211, so that said flap is bent downward on each side to conform to the form of the shaper so that the ears 212 of the flap lie over the slits 201 and slightly back of them.

The next operation is that of pushing the ears into the slits, and for this purpose there is provided a two pronged fork 235 secured upon an arm 236 of a lever 237 pivoted at 238 upon a rearward extension 239 of the frame, said lever carrying at its lower end a roller 240 operated by a crown cam 241 upon the cam disk 182. A spring 242 is secured to said arm and brings the forks downward, while the cam operates against said spring to move the forks upward. At the proper time the cam allows the spring to act so that the fork descends, and the prongs thereof press upon the upper surface of the ears and press them down and also press down the portions of the flaps within the slits, these slits being cut in three sides of a rectangle. The shaper now withdraws slightly to allow the points of the ears to enter the slits, and then the fork 235 rises to remove the pressure from the ears. At the same time the depending arm 218 of the lever 219 moves rearwardly and the lever 219 presses down the flap 211 causing the ears to move outwardly into the slits, because, the center of the flap moves down. While this is taking place the shaper continues to move out of the way so that the flap 211 can be pressed down flat and the ears are inserted entirely into the slits. When the depending arm 218 of the lever was withdrawn, the forked bender 230 was also withdrawn from the flap, this being effected by means of a spring attached to said bender and to the frame. The lever 219 is now withdrawn, so that all the parts are in position for operation upon the next carton. They remain at rest for about one-third of a revolution of the cam disk or of a cycle of the machine to allow the next carton to be pushed into position and justified therein to be operated upon.

Before describing the electrical circuits which control the action of various parts of the apparatus, it may be stated that the packing apparatus heretofore described is intended for use in conjunction with a line of machinery for processing and seeding raisins. This line of machinery is illustrated in outline in Fig. 31, in which 250 represents a sweating machine for softening the raisins before feeding them to the raisin seeding machine, shown at 270. The raisins are fed into a hopper 252, and are conveyed by suitable apparatus to the other end of the sweating machine 250 in a substantially closed chamber 254, being heated therein by means of steam coils 255 and moistened by live steam introduced thereinto by a pipe 256.

257 is the shaft for operating the conveying means, which may be of any preferred character. This shaft 257 is driven from a main shaft 258 by pulleys 259, 260 and belt 261.

From the sweating machine the raisins are delivered by a spout 262 to a feeder 263 which is operated by a shaft 264 driven by a pulley 265 from the main shaft 258 by means of a belt 269, said feeder 263 feeding the raisins to the raisin seeder 270. From said seeder they are delivered to the hopper 271 of a feeder operated by means of a shaft 273 driven by pulleys 274, 275 and belt 276 from the main shaft. By said feeder they are fed to a spout 82 of the packing machine heretofore described.

The main shaft 258 is intermittently driven in like manner as the main shaft of the packing apparatus heretofore described, that is to say, by an iron disk 277 which is attracted by a pulley 278 of the constantly driven shaft 279 when said pulley is converted into an electric-magnet by a current being passed through coils in the same, said coils being connected by means of brushes and a collector ring with wires 280, 281. The arrangement of these wires is illustrated diagrammatically in Fig. 34, in which a wire 282 leads from, and a wire 283 leads to, a suitable source of power which is preferably a low voltage generator, said wires being connected to a fuse box 283 from which lead wires 284, 285. One of these wires 284 runs to a lever 286 pivoted on the floor on the side of the packing machine in a suitable position for an operator, preparing the cartons for being packed, to break the circuit at 287 by pressing the lever to one side by the knee. The circuit at this point is normally maintained closed by a tension spring 288. The lever is grounded by the frame of the machine. The other side of the circuit 285 connects with a wire 20 which leads to one of the brushes 19 which is in connection with the collector ring 18 on the driving pulley 9 which forms the magnetic clutch, the other brush being connected to a wire 21 which leads to the solenoid coil 89 and then leads by a wire 290 to the contact 90 which is closed by the descent of the scale platform in weighing the raisins. This wire 290 is also connected to the ground, as shown, by a resistance 291, the object of the resistance being to prevent the formation of an arc at 90 in making and breaking the contact. This resistance is of sufficient ohmage to deënergize the solenoid coil when the current passes therethrough. From the wire 21, a wire 292 leads to a contact brush 293 which wipes the periphery of the cam wheel 26, part of which 294 is insulated, so that the wire 292 is grounded when the brush is on the metallic part of the periphery and thus the circuit is kept closed through the magnetic clutch 9 at that time. Another branch from the wire 285 leads to the magnetic clutch 278 upon the shaft 279. It will now be seen that by pressing the lever 286 to one side the whole circuit is broken so that both clutches are deënergized and not only is the packing apparatus stopped, but also the feeders are independently stopped and the flow of fruit is arrested, thus avoiding a flood of raisins when the machine is inoperative from any cause that makes it necessary to operate the lever 286.

If the brush 293 reaches the insulated portion 294 of the cam wheel 26, the circuit is broken, and the machine stops. While it is at rest the raisins or other material are dropping into the carton, and when the proper weight is obtained therein, the carton descends, the circuit is reëstablished through the scale beam contact 90 and the machine is re-started. This circuit through the contact 90 is maintained long enough to clear the brush 293 from the insulation, and then the circuit is reëstablished through the metallic portion of the wheel 26 for the remainder of the revolution thereof.

By carefully adjusting the feed it may be arranged that the carton is full at or just before the time when the brush 293 arrives at the insulated portion 294 of the wheel 26, that there is little or no stoppage of the machine.

In Figs. 32, 33 is shown a modified arrangement of feed mechanism for feeding the stream of raisins or other material to the carton. In this case a spout is used which is single at the upper end 300, and downward from said upper end the spout widens and is divided by inner walls into two branches 301, 302, said branches being directed to two funnels one 303 within the carton upon the scale platform and the other 304 within the carton next succeeding that upon the scale platform. There is in the upper end of the spout an adjustable partition 306, adjusted by means of an arm 307 on the shaft 308 of said partition to which is connected a link 309 passing through a bearing 310 in the side of the spout, and secured therein in any desired position by a set screw 311. This partition is so adjusted that about three-fourths of the stream of raisins are directed into the rear carton, and one-fourth into the carton on the scale platform. A more accurate weighing can thus be obtained as there is a light stream running on to the scales without diminishing the amount packed in the carton. Both spouts have gates 313, 314 on the same spindle 315 carrying a crank 316 attached by a connecting link 317 to a core 318 of the solenoid 319, so that both gates are operated at the same time.

While I have in the specification and claims referred to the package which is being filled as a carton, it is to be understood that my invention is applicable to machines for filling any kinds of packages of any material and of any shape. Also that my invention is not limited to the precise construction herein shown, but that many modifications and changes may be made therein without departing from the spirit of the invention.

I claim:—

1. In an apparatus of the character described, the combination of a channel for cartons and mechanism for moving the cartons in the channel consisting of a shaft rocking and also reciprocating longitudinally, means for so rocking and reciprocating said shaft and devices carried by said shaft engaging the cartons, substantially as described.

2. In an apparatus of the character described, the combination of a guideway for cartons, means for advancing the same comprising a shaft, pushers secured thereto adapted to engage the cartons to advance the same, means for moving the shaft longitudinally, comprising a cam wheel having a cam, and a lever operated thereby, and means for rocking the shaft comprising a second cam on said cam wheel, a lever operated thereby, a rack reciprocated by said lever, and a gear wheel on said shaft operated by said rack, substantially as described.

3. In an apparatus of the character described, the combination of a guideway for the cartons, means for advancing the same along the guideway, mechanism located above the guideway for operating upon the cartons, a stop in the guideway past which the cartons can pass freely, and means for moving the carton which has just passed the stop back against said stop to justify the same, said stop being so located that the carton moved back against the stop is underneath said means for operating upon the same, substantially as described.

4. In an apparatus of the character described, the combination of a guideway, means for advancing cartons thereinto, a pivoted latching stop, a spring for pressing the same inward into the guideway, means for moving back against said stop a carton which has passed the same, and a closing device located above the guideway for closing the carton so moved back against said stop, substantially as described.

5. In an apparatus of the character described, the combination of a guideway for a line of cartons, a closing device above the guideway for closing the cartons which have been filled, means for advancing the cartons along the guideway and means for discharging the leading carton from the guideway and for justifying the carton underneath said closing means, substantially as described.

6. In an apparatus of the character described, the combination of a guideway, advancing means for advancing cartons along the same, closing mechanism for closing in succession the cartons after they have been filled, and means for simultaneously withdrawing the advancing means out of engagement with the cartons, justifying a carton underneath said closing mechanism, and discharging the leading carton, substantially as described.

7. In an apparatus of the character described, the combination of a guideway, advancing means for advancing cartons along the same, closing mechanism for closing in succession the cartons after they have been filled, and means for simultaneously withdrawing the advancing means out of engagement with the cartons, justifying a carton underneath said closing mechanism, and discharging the leading carton, substantially as described.

8. In an apparatus of the character described, the combination of a reciprocating and rocking shaft, pushers secured thereto, a discharger for the leading carton, and means operated simultaneously with the rocking of said shaft for actuating said discharger to discharge the leading carton, substantially as described.

9. In an apparatus of the character described, the combination of a depressor provided with side fingers, the ends of which are slightly raised to impinge upon a flap above the bending line to cause the flap to bend over the said line, means adapted to subsequently engage the flap to press it into a horizontal position, and means for completing the closure of the carton top, substantially as described.

10. In an apparatus of the character described, in means for closing the top of a carton, a depressor provided with two side fingers, and a central shaper spaced from said side fingers, substantially as described.

11. In an apparatus of the character described, in means for closing the top of a carton, a depressor having two side fingers, the ends of which are slightly raised, a broad central shaper between said side fingers, and means for causing said depressor to move across the top of the carton, the upturned ends of the side fingers being arranged to first engage the flap, substantially as described.

12. In an apparatus of the character described, in means for closing the top of a carton, a depressor having a substantially flat under surface engaging a flap of the carton to depress the same and having a centrally ridged upper surface to shape the opposite flap when pressed down over said shaper, substantially as described.

13. In an apparatus of the character described, in means for closing the top of a carton, a device engaging the flap on one side of the carton to bend the same horizontally, and a forked device engaging the opposite flap to bend the sides of said flap down on each side of the first device, and means for operating said devices in the order indicated, substantially as described.

14. In an apparatus of the character described, in means for closing the top of a carton, a device operating to press down the slit flap of the carton, a device operating on the opposite flap to bend the sides thereof downward, and prongs arranged to descend upon said sides and press the same into said slits, substantially as described.

15. In an apparatus of the character described, in means for closing the top of the carton, a shaper arranged to depress the slit flap, a bender arranged to engage the opposite flap and to bend the same over said shaper, prongs arranged to engage the ears of said opposite flap, and means for withdrawing the shaper, then withdrawing the prongs to remove the pressure from the ears, and then depressing the center of said opposite flap, substantially as described.

16. In an apparatus of the character described, in means for closing the top of a carton, means for bending the slit flap into position, means for bending the opposite flap over the slit flap, means for bending down the sides of said flap from the center, and means for subsequently forcing down the center of said opposite flap to force the ears thereof into the slits, substantially as described.

17. In an apparatus of the character described, the combination of a generator of electricity, a line running therefrom to ground, a switch therein, packing machinery, an electro-magnetic clutch controlling said machinery, a gate for the supply of the material to said machinery, an electro-magnetic device controlling said gate, weighing scales for each package, a line from the clutch to the device, a contact controlled by the descent of the scale pan and leading to the other pole of the device, and a second line leading from said contact to the ground, substantially as described.

18. In a packing machine, a carrier adapted to receive funnels provided with cartons, means for filling the cartons, means for removing the filled cartons at one point, means for removing the funnels at another point, and means for closing the cartons, substantially as described.

19. In a box closing machine, pivoted fingers for folding the side flaps of the box, a finger for folding down the back flap, having an upper surface with a raised central portion, and a fourth pivoted finger having a part adapted to coöperate with the end of the finger for the back flap and guide the ears upon the front flap into the openings in the back flap, substantially as described.

20. In a box closing machine, the combination of fingers for closing down the side flaps and the back flap respectively means to fold down and guide the ears on the front flap into the openings in the back flap, and cams adapted to actuate the fingers for the side flap, the back flap, and the front flap, respectively in succession, the cams for actuating the fingers for the back flap and front flap operating to effect the withdrawal of the finger for the back flap as soon as the ears in the front flap have been inserted into the openings in the back flap, whereby the flat portion of the fourth finger presses down the front flap, substantially as described.

21. In a box closing machine, the combination of a finger having an upper surface with a raised central portion, adapted to engage the back flap of a box, and a two-part device for engaging a front flap, consisting of a bender for bending said flap, and a presser for pressing it into position, substantially as described.

In witness whereof I have hereunto set my hand in the presence of two subscribing witnesses.

NEWTON BOOTH CONVERSE.

Witnesses:
L. B. HAYHURST,
MILES WALLACE.